United States Patent
Tan et al.

(10) Patent No.: US 7,610,476 B1
(45) Date of Patent: Oct. 27, 2009

(54) MULTIPLE CONTROL SEQUENCES PER ROW OF MICROCODE ROM

(75) Inventors: Teik-Chung Tan, Austin, TX (US); Gregory William Smaus, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1292 days.

(21) Appl. No.: 10/729,331

(22) Filed: Dec. 5, 2003

(51) Int. Cl.
*G06F 9/22* (2006.01)
*G06F 9/30* (2006.01)

(52) U.S. Cl. ................................ 712/245
(58) Field of Classification Search ............ 712/245
See application file for complete search history.

(56) References Cited

U.S. PATENT DOCUMENTS

| | | | |
|---|---|---|---|
| 4,338,661 A * | 7/1982 | Tredennick et al. | 712/234 |
| 4,714,991 A | 12/1987 | Eaton | |
| 5,634,047 A | 5/1997 | Getzlaff et al. | |
| 5,761,470 A * | 6/1998 | Yoshida | 712/210 |
| 5,796,974 A | 8/1998 | Goddard et al. | |
| 5,930,492 A | 7/1999 | Lynch | |
| 6,023,757 A * | 2/2000 | Nishimoto et al. | 712/209 |

* cited by examiner

*Primary Examiner*—Eddie P Chan
*Assistant Examiner*—Robert E Fennema
(74) *Attorney, Agent, or Firm*—Robert C. Kowert; Meyertons, Hood, Kivlin, Kowert & Goetzel, P.C.

(57) ABSTRACT

Various embodiments of methods and systems for storing multiple groups of microcode operations and corresponding control sequences per row of microcode ROM are disclosed. In one embodiment, an integrated circuit may include a microcode ROM coupled to a control sequence logic unit. The microcode ROM may store multiple groups of microcode operations per row. For each group of microcode operations stored in a row, a corresponding control sequence may also be stored in the row. Each group of microcode operations may be included in a microcode routine. The groups of microcode operations stored in a row may be included in the same microcode routine, or some of the groups may be included in different microcode routines.

27 Claims, 7 Drawing Sheets

MULTIPLE CONTROL SEQUENCES PER ROW OF MICROCODE ROM

BACKGROUND OF THE INVENTION

1. Field of the Invention

This invention is related to the field of integrated circuits, and more particularly, to processing microcoded instructions within an integrated circuit.

2. Description of the Related Art

Certain instructions within the x86 instruction set are quite complex, specifying multiple operations to be performed. While it may be possible to implement hardware to execute any instruction directly, the cost of such implementation in terms of the number of transistors required and/or die area needed may be prohibitive in some cases. In the case of an instruction set like the x86 instruction set mentioned above, which is rich in complex instructions, the hardware required to execute all instructions directly may be enormous. In fact, current integrated circuit production methods may not be adequate to produce a single chip capable of executing all x86 instruction directly in hardware. Fortunately, other methods for executing complex instructions have been developed such as decomposing a complex instruction into a set of more elementary operations, referred to herein as microcode, which can be executed directly on hardware that is far less complex. Methods for executing these "microcoded" instructions are described in more detail below.

Often, complex instructions are classified as microcoded instructions. Microcoded instructions are transmitted to a microcode instruction unit within the integrated circuit, which decodes the complex microcoded instruction and produces two or more less-complex microcode operations for execution by the integrated circuit. The simpler microcode operations corresponding to the microcoded instruction are typically stored in a read-only memory (ROM) associated with the microcode unit. Thus, microcoded instructions are often referred to as microcode ROM (MROM) instructions. Once the microcode operations are output from the microcode ROM unit, these operations are typically included within the operation stream that is dispatched to one or more devices that schedule operations for execution (schedulers). Typical microcode ROM units, in effect, perform instruction expansion on the microcoded instruction.

Less complex instructions are typically directly decoded by hardware decode units within the integrated circuit. The terms "directly-decoded instruction" or "fastpath instruction" or "non-complex instruction" may be used interchangeably herein to refer to an instruction that is decoded and executed by the integrated circuit without the aid of a microcode instruction unit. Directly-decoded instructions are decoded into component operations via hardware decode, without the intervention of a microcode instruction unit, and these operations are executed by functional units included within the integrated circuit.

Microcode routines may be composed of any number of microcode operations. Typically the operations that make up a microcode routine are stored in sequential rows of a microcode ROM with a control sequence for each row. FIG. 1 shows a microcode ROM storing one group of microcode operations 720 along with one control sequence 710 per row. The operations of microcode routine one are divided into three groups. The first group 720A of the first microcode routine is stored in the first row of microcode ROM 700 along with control sequence 710A, which contains information indicating that microcode routine one is continued in the second row of the microcode ROM. The second group 720B of the first microcode routine is stored in the second row of microcode ROM 700 along with control sequence 710B which contains information indicating that the first microcode routine is continued in the third row of the microcode ROM. The final group of operations 720C is stored in row three. Similarly, the groups of microcode operations composing the other microcode routines and corresponding control sequences are stored in subsequent rows of microcode ROM 700. Some groups of microcode operations like 720F fill an entire row of the microcode ROM while others like 720D fill only a small fraction of a row's capacity. For example, when segmenting a microcode routine for storage in sequential rows of a microcode ROM, a group of operations at the end of the routine may contain one or two operations more than can be stored in a single row. The excess operation or two must be stored in the following row. Thus, a significant portion of the microcode ROM's storage capacity may be unused.

SUMMARY

Various embodiments of methods and systems for storing multiple groups of microcode operations and corresponding control sequences per row of microcode ROM are disclosed. In one embodiment, an integrated circuit may include a microcode ROM coupled to a control sequence logic unit. The microcode ROM may store multiple groups of microcode operations per row. For each group of microcode operations stored in a row, a corresponding control sequence may also be stored in the row. Each group of microcode operations may be included in a microcode routine. The groups of microcode operations stored in a row may be included in the same microcode routine, or some of the groups may be included in different microcode routines. For example, in an embodiment where two groups of microcode routines and their associated control sequences are stored per row in the microcode ROM, the first group stored in the row may be the last group of microcode operations included in one microcode routine, while the second group stored in the row may be the first group of microcode operations included in another microcode routine.

During the execution of a microcode routine, the microcode unit may access a group of microcode operations stored in one row of the microcode ROM. In response to this access, the control sequence logic unit may use the information included in the control sequence associated with the group of microcode operations to determine the location of the next group of microcode operations included in the microcode routine. For example, in an embodiment where two groups of microcode routines and their associated control sequences are stored per row in the microcode ROM, the control sequence logic unit may determine the address of the row storing the next group of microcode operations included in the microcode routine. The control sequence may also indicate both groups of microcode operations stored in the row are included in the microcode routine and both groups should be output to the scheduler during the next access cycle. Alternatively, the control sequence may indicate that only the first group of microcode operations stored in the row is included in the microcode routine and that NOPs should be substituted for the second group of microcode operations when outputting the row to the scheduler during the next access cycle.

In some embodiments a group of microcode operations being accessed may include one or more branch operations. The control sequence associated with this group of microcode operations may include information indicating different locations for subsequent groups of microcode operations depending upon whether the branches are taken or not taken. For example, if the group of microcode operation being accessed includes a conditional branch operation, the control sequence logic unit may use the branch prediction unit to determine whether the branch will be taken or not taken. If the branch is predicted to be taken, the control sequence may indicate that the second group of microcode operations stored in a row at a certain address should be output next, whereas if the branch is predicted to be not taken, the control sequence may indicate that both the first and second groups of microcode operations stored in that row output next.

In some embodiments, the microcode ROM may be divided into multiple segments. Within a given segment of the microcode ROM, each row may store the same number of groups of microcode operations and associated control sequences. For example, rows in one segment of the microcode ROM may store four groups of microcode operations and four control sequences each, while rows in another segment may store two groups of microcode operations and two control sequences each. In some cases, each group of microcode operations stored within a particular segment of the microcode ROM may be of the same maximum width. The maximum width of a group of microcode instructions may be the sum of a number of data, memory, and branch operations. In one embodiment, a group of microcode operations may include a maximum of four data operations, four memory operations, and two branch operations. Note, not all groups of microcode operations may contain the maximum allowable number of operations due to constraints imposed by the compiled sequence of the individual operations.

As another example, one segment of a microcode ROM may store two groups of microcode operations and two control sequences per row. The maximum width of each of these groups may be two data operations, two memory operations, and one branch operation. Another segment of this microcode ROM may store one group of microcode operations and one control sequence per row. The maximum width of groups in this segment may be four data operations, four memory operations, and two branch operations. When accessing groups of microcode operations from this microcode ROM, the control sequence logic unit may determine the position within a row of a group to be output during the next access cycle based on the segment of the microcode ROM in which the row is located. For example, the control sequence associated with a group of microcode operations currently being accessed may include the address of a row in the microcode ROM along with an indication of which of the N groups stored in the row is the next group in the microcode routine to be accessed. The control sequence logic unit may use the address of the row to determine segment of the ROM that includes the row. The control sequence may indicate that the desired group of microcode operations is the second group stored in the row. The segment that includes the address of the row may include three groups of microcode operations per row and the specific address of any one of the three groups may be the address of the row plus N−1 times the maximum width of a group and control sequence. Therefore, the control sequence logic unit may access the specified group dependent on the segment of the ROM which includes the ROW and the ordinal designation of the group.

BRIEF DESCRIPTION OF THE DRAWINGS

A better understanding of the present invention can be obtained when the following detailed description is considered in conjunction with the following drawings, in which.

Figure 1:
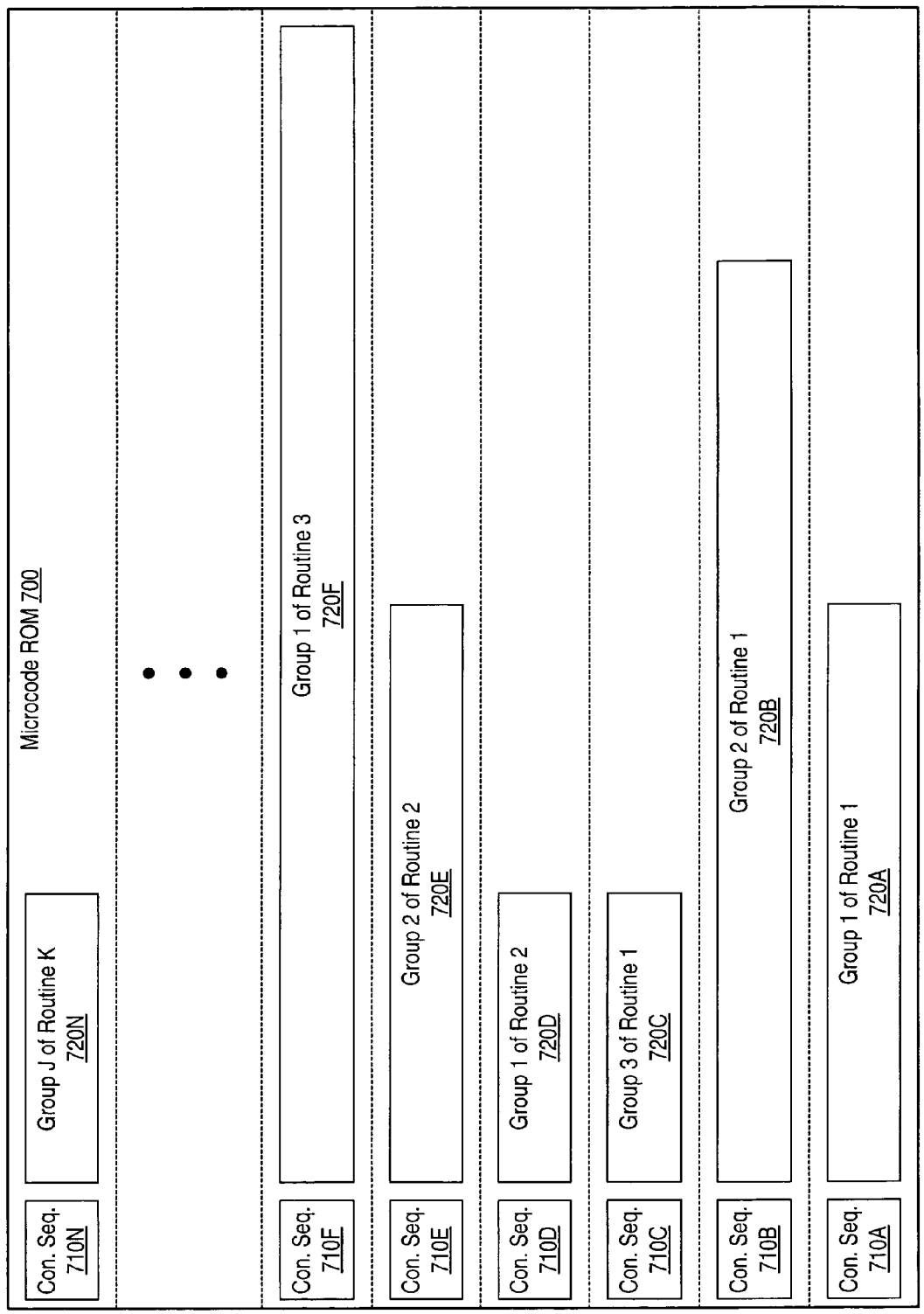
FIG. 1 shows a microcode ROM storing one group of microcode operations and one control sequence per row.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Figure 2:
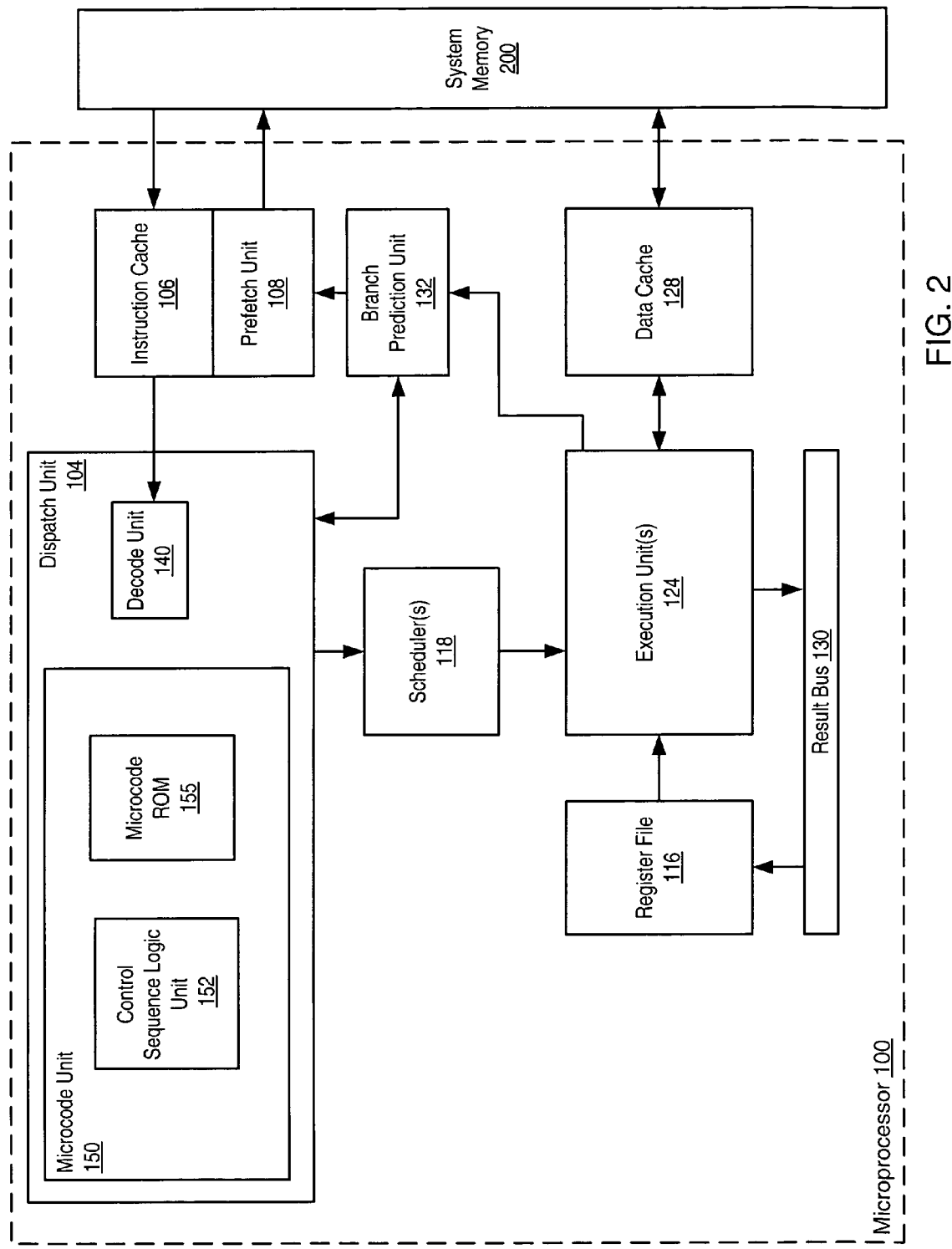
FIG. 2 illustrates a microprocessor that includes a microcode ROM storing multiple groups of microcode operations and associated control sequences per row, according to one embodiment.

FIG. 2 is a block diagram of logical components included in one embodiment of a microprocessor 100 that stores multiple control sequences per row of microcode ROM. Microprocessor 100 may be implemented as a single integrated circuit. Microprocessor 100 may include a dispatch unit 104, one or more schedulers 118, and one or more execution cores 124. Dispatch unit 104 may include a microcode unit 150, control sequence logic unit 152, and microcode ROM 155. Microprocessor 100 is configured to execute instructions stored in a system memory 200. Many of these instructions operate on data stored in system memory 200. Note that system memory 200 may be physically distributed throughout a computer system and may be accessed by one or more microprocessors 100. In some embodiments, the microprocessor 100 may be designed to be compatible with the x86 architecture. Note that microprocessor 100 may also include and/or be coupled to many other components in addition to those shown here. For example, additional levels of cache may be included (internal and/or external to microprocessor 100) between microprocessor 100 and system memory 200.

Similarly, microprocessor 100 may include a memory controller configured to control system memory 200 in some embodiments. Additionally, the interconnections between logical components may vary between embodiments.

Microprocessor 100 may include an instruction cache 106. Microprocessor 100 may include a prefetch unit 108 coupled to the system memory 200. Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Prefetch unit 108 may also fetch instructions from instruction cache into dispatch unit 104. Instructions may be fetched from system memory 200 in response to a given address missing in instruction cache 106.

A dispatch unit 104 may be configured to receive instructions from instruction cache. The dispatch unit 104 may include a decode unit 140 to decode instructions received from instruction cache 106. The dispatch unit 104 may also include a microcode unit 150 for use when handling microcoded instructions.

The dispatch unit 104 is configured to dispatch operations to scheduler(s) 118. One or more schedulers 118 may be coupled to receive dispatched operations from dispatch unit 104 and to issue operations to one or more execution cores 124. Results generated by execution core(s) 124 may be output to a result bus 130. These results may be stored to register file 116.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may be used to decode certain instructions into one or more operations executable within execution core(s) 124. Simple instructions may correspond to a single operation. More complex instructions may correspond to multiple operations. Upon receiving an operation that involves the update of a register, the dispatch unit 104 may reserve a register location within register file 116 to store speculative register states (in an alternative embodiment, a reorder buffer may be used to store one or more speculative register states for each register).

When operations are handled by dispatch unit 104, if a required operand is a register location, register address information may be routed to a register map or a reorder buffer. For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an operation. Register file 116 may have one or more previously allocated physical registers assigned to a logical register specified as a source operand in a given operation. The register map may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 116) through load/store unit 126. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The microprocessor 100 of FIG. 2 may support out of order execution. A retire queue 102 (or, alternatively, a reorder buffer) may keep track of the original program sequence for register read and write operations, allow for speculative instruction execution and branch misprediction recovery, and facilitate precise exceptions. In many embodiments, retire queue 102 may function similarly to a reorder buffer. However, unlike a typical reorder buffer, retire queue 102 may not provide any data value storage. In alternative embodiments, retire queue 102 may function more like a reorder buffer and also support register renaming by providing data value storage for speculative register states. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to a register map indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

The bit-encoded operations and immediate data provided at the outputs of dispatch unit 104 may be routed to one or more schedulers 118. Note that as used herein, a scheduler is a device that detects when operations are ready for execution and issues ready operations to one or more execution cores. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect prefetch unit 108. The redirected prefetch unit 108 may then begin fetching the correct set of instructions from instruction cache 106, trace cache 160, and/or system memory 200. Results produced by components within execution core(s) 124 may be output on the result bus 130 to the register file 116 if a register value is being updated.

Data cache 128 is a cache memory provided to temporarily store data being transferred between register file 116 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

Microcode Unit

Dispatch unit 104 may include a microcode unit 150. Microcode unit 150 may include and/or be coupled to control sequence logic unit 152 and microcode ROM 155 that stores microcode routines corresponding to each microcoded instruction. Microcode unit 150 may handle microcoded instructions detected within the instruction stream input to dispatch unit 104. Microcode unit 150 may perform microcode entry point generation for each microcoded instruction detected within the instruction stream. The microcode instruction unit 150 may dispatch the microcode operations to one or more schedulers 118. The microcode operations are thereafter issued and executed in a similar fashion to other decoded operations.

Different microcoded instructions may require differing numbers of microcode operations to effect their corresponding functions. Additionally, the number of microcode operations corresponding to a particular microcoded instruction may vary according to the addressing mode of the instruction, the operand values, and/or the options included with the instruction. It is noted that the microcode operations may be defined within the instruction set or may be customized for the particular microprocessor on which they are to execute.

Microcode ROM 155 may store one or more groups of microcode operations included per row of microcode ROM 155. A group of microcode operations may have a specific format. For example, in one embodiment, a group may contain up to four memory operations, four data operations, and two branch operations. It is noted that this may represent a maximum number of each type of operation that may be stored within a group and that there may be many reasons why a particular group contains fewer than the maximum number of operations of a given type. A format may be selected for compatibility with another source of operations, such as a trace cache (not shown).

Microcode ROM 155 has a particular line width, expressed as the maximum number of operations per line, or row, of the microcode ROM. For a given embodiment, this line width may depend on the scheduler 118 configuration and the microcode ROM 155. In one embodiment, if the maximum rate at which the microcode ROM 155 can be accessed is half the maximum rate at which the scheduler 118 operates, the line width of the microcode ROM 155 may be selected to be twice that of the width of the scheduler 118. For example, if the scheduler 118 is capable of dispatching two operations per cycle and if two cycles are required to access the microcode ROM 155, the microcode ROM 155 line width may be selected to be four operations per line. Given the selected line width and access rate of the ROM, the ROM 155 keeps the scheduler 118 more fully supplied with operations.

Each group of microcode operations may have a corresponding control sequence. The control sequence corresponding to a group of microcode operations contained in a microcode routine may contain information that can be used by control sequence logic unit 152 to determine which group of microcode operations is to be fetched next. The information may indicate the address of the row of the microcode ROM in which the next group of microcode operations is stored. If multiple groups of microcode operations are stored in the indicated row, the control sequence may also indicate which group of microcode operations within the identified row is the next group of microcode operations. If the group of microcode operations contains a branch operation, the control sequence associated with that group may indicate which group of microcode operations is the next group if the branch is taken and which group of microcode operations is the next group if the branch is not taken. The control sequence logic unit 152 may use the information contained in the control sequence in conjunction with one or more branch predictions from branch prediction unit 132 to determine the location in the microcode ROM of the next group of microcode operations to be executed in the microcode routine. Note that control sequence logic unit 152 is a means for accessing a control sequence associated with one of a plurality of groups of microcode operations and responsively accessing a next group of microcode operations stored in the microcode ROM.

In some embodiments, microcode unit 150 may generate an entry point for a microcode routine corresponding to a microcoded instruction by asserting an address in microcode ROM address space which targets a row of microcode ROM 155 which stores the first group of microcode operations of the microcode routine. Microcode ROM 155 may decode this address and output the first group of microcode operations in the microcode routine to scheduler 118. The control sequence logic unit 152 may utilize the information contained in the control sequence corresponding to the first group of microcode operations of the microcode routine to determine the location of the next group of microcode instructions in the microcode routine. Microcode ROM 155 may output subsequent lines of the microcode routine until the last group of microcode operations in the microcode routine has been output.

Figure 3:
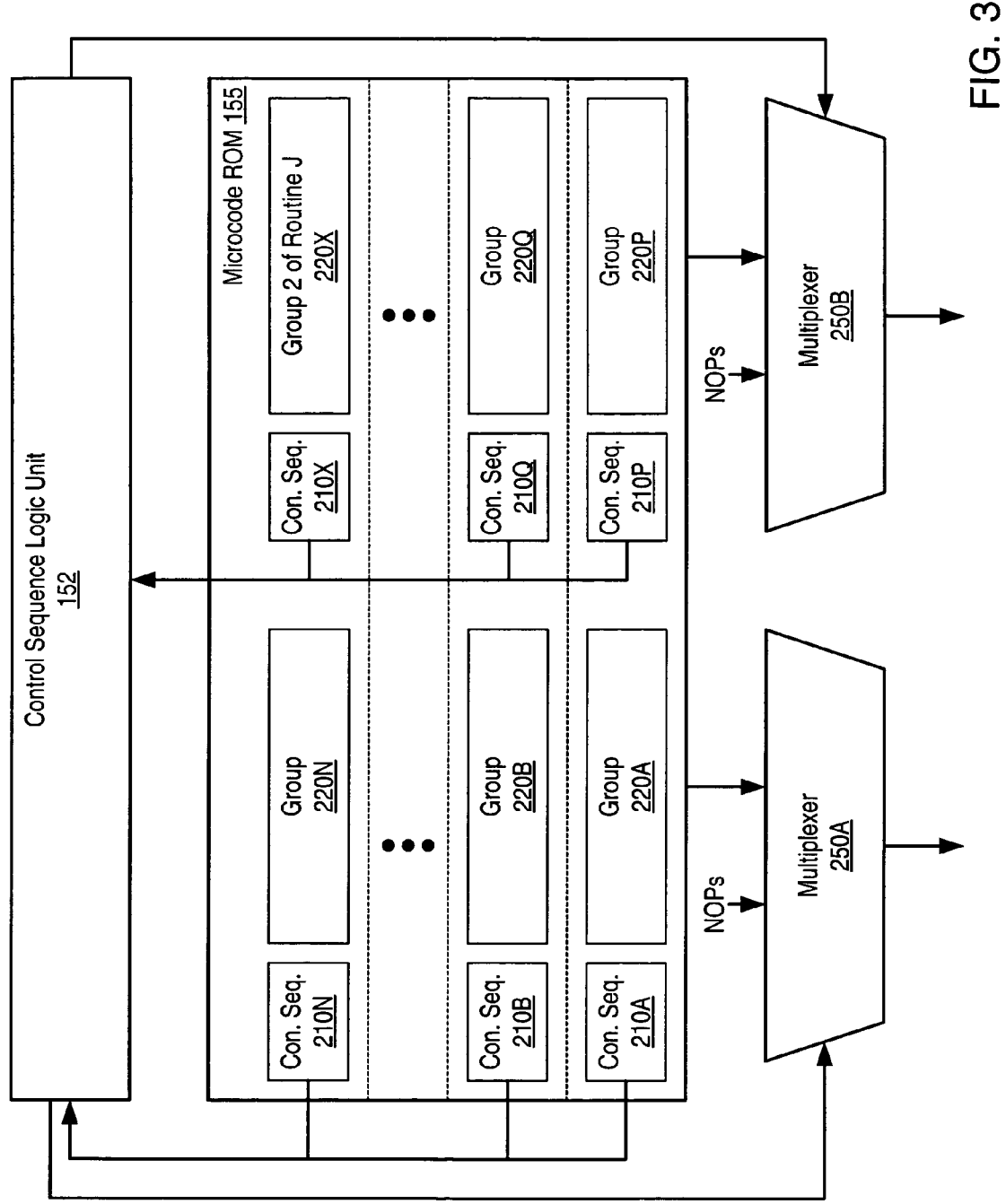
FIG. 3 illustrates a microcode ROM storing two groups of microcode operations and associated control sequences per row, according to one embodiment.

In some embodiments, a microcode ROM 155 may store two groups of microcode operations per row and each group may be the same maximum width, as depicted in FIG. 3. Note with regard to FIG. 3, groups 220A-220N are designated as being stored at higher order address positions within their rows than groups 220P-220X respectively. Therefore, groups 220A-220N will be referred to as high order groups while groups 220P-220X will be referred to as low order groups.

In some embodiments, microcode ROM 155 may be configured to output a line of microcode operations containing two groups of microcode operations each access cycle. If the scheduler 118 is configured to receive up to two groups of microcode operations per microcode ROM access cycle, the control sequence logic unit 152 may select one or both groups in the row for output to the scheduler 118 by generating the appropriate inputs to multiplexers 250A and 250B. If one of the groups in a given row is not selected, the control sequence logic unit 152 may generate signals causing the appropriate multiplexer to output NOPs instead of the non-selected group. In one embodiment, the control sequence logic unit 152 may select which groups to output from each row based on the control sequence that identified that row as the row containing the next group of microcode operations in a particular microcode routine. For example, the control sequence 210A associated with group 220A may indicate that the next groups of microcode operations to output are groups 220B and 220Q. In that situation, the control sequence logic unit 152 may cause the contents of the row containing those groups to be output and cause each multiplexer 250 to output the operations retrieved from microcode ROM (as opposed to replacing one group with NOPs). In one such embodiment, the control sequence logic unit 152 may selectively use a single control sequence (e.g., either control sequence 210B or 210Q but not both) from the identified row to select the next group of operations to retrieve.

If instead the control sequence 210A associated with group 220A indicates that group 220B is the next group to output and that group 220Q is not to be output, the control sequence logic unit 152 may cause multiplexer 250B to replace group 220Q with NOPs and scheduler 118 may receive a line containing group 220B and NOPs.

In some embodiments, each control sequence 210 may identify a single group of microcode operations (as opposed to being able to identify more than one group of microcode operations as described above). For example, the row containing groups 220A and 220P may be retrieved in response to group 220A being identified by a microcode entry point. The control sequence logic unit 152 may cause group 220P to be replaced with NOPs when outputting operations from that row to the scheduler 118. The control sequence 210A associated with group 220A may indicate that group 220P, which is stored in the same row of microcode ROM, is the next group of microcode operations to retrieve. In response to control sequence 210A, the control sequence logic unit 152 may again retrieve the contents of that row, this time replacing group 220A with NOPs.

If a group of microcode operations 220 being retrieved includes a branch operation, the control sequence 210 associated with that group of operations may identify the next group of microcode operations for either branch outcome. For example, a group of microcode operations 220A may contain a branch operation. The branch prediction unit 132 may predict that the branch will be taken. The control sequence 210A may indicate that group 220P is the next group if the branch is not taken and that group 220Q is the next group if the branch is taken. In response to control sequence 210A and the branch prediction, control sequence logic unit 152 may responsively access the row containing groups of microcode operations 220B and 220Q, and provide signals to multiplexer 250A selecting NOPs to be output in place of group 220B. Thus, a line composed of NOPs and the low order group 220Q may be sent to the scheduler.

Figure 4:
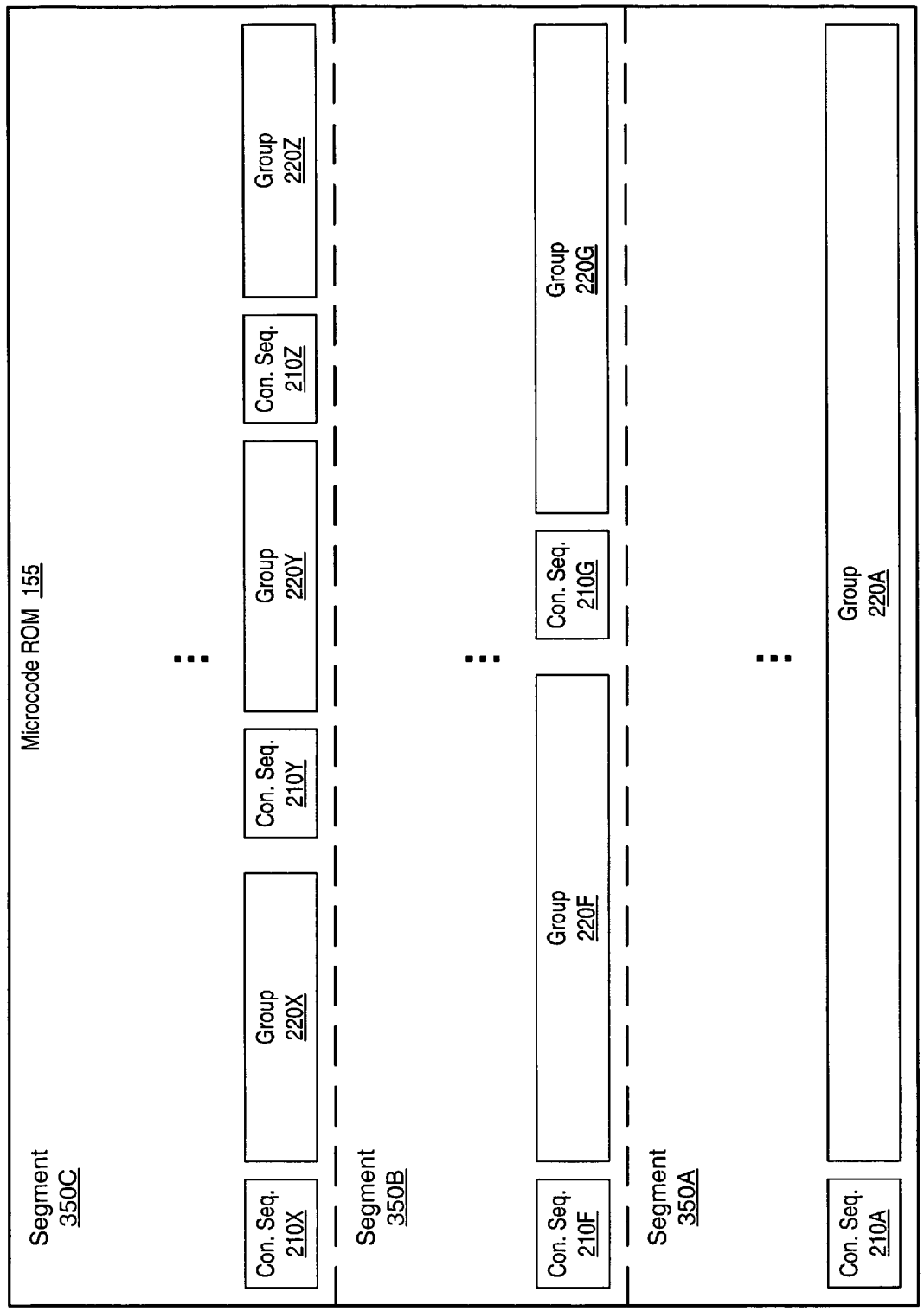
FIG. 4 illustrates a microcode ROM storing multiple groups of microcode operations and their associated control sequences per row, according to one embodiment.

FIG. 4 illustrates an embodiment of a microcode ROM 155 storing multiple groups 220 of microcode operations and their associated control sequences 210 per row, in which groups are segregated into different segments 350 of the microcode ROM according to group width. All groups of microcode operations of the same width may be stored in a particular segment 350 of the microcode ROM. Each segment 350 of the microcode ROM 300 may be defined as a set of rows of the microcode ROM with a sequential range of addresses. The control sequence logic unit 152 may determine the locations of the control sequences 210 within a row of microcode ROM 155 dependent upon the segment 350 in which they are stored. For example, if a row within segment 350A is accessed, control sequence logic unit 152 may recognize that only one control sequence will be stored within that row and accordingly determine the control sequence location. If instead a group within a row of segment 350B is accessed, the control sequence logic unit 152 may recognize that two control sequences are stored in that row (control sequences may be aligned at the same location within each row in the same segment) and select the appropriate control sequence dependent on which group of operations in that row is being retrieved.

In some embodiments, segment 350A of microcode ROM 155 may contain rows in which a single maximum size group, such as group 220A, and an associated control sequence (e.g., control sequence 210A) are stored per row. Control sequence 210A and group 220A may fill a row of microcode ROM 155 to the extent that no other group of microcode operations and associated control sequence may be stored in the unused space. Segment 350B of microcode ROM 155 may contain rows in which two groups (e.g., groups 220F and 220G) of microcode operations of a different maximum size (relative to the maximum size of groups in segment 350A) and their control sequences may be stored. Similarly, segment 350C of microcode ROM 155 may contain rows in which three groups (e.g., groups 220X, 220Y, and 220Z) of microcode operations of a still smaller maximum size and their control sequences may be stored. Note that alternative embodiments may store different and/or additional numbers of groups of microcode operations in each segment. Also note that alternative embodiments may include fewer or additional segments 350.

By selecting of the maximum widths for groups of microcode operations such that an integer multiple of groups of microcode operations and associated control sequences is likely to fill each row of microcode ROM 155, a high utilization of the storage capacity of the microcode ROM may be achieved.

Figure 5A:
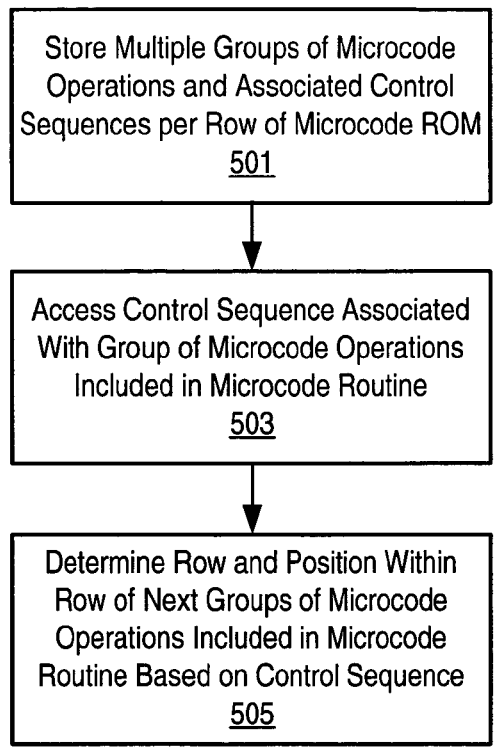
FIG. 5A is a flowchart of a method of operating an integrated circuit containing a microcode ROM storing multiple groups of microcode operations and their associated control sequences per row, according to one embodiment.

FIG. 5A is a flowchart of one embodiment of a method of operating an integrated circuit containing a microcode ROM. Multiple groups of microcode operations and their associated control sequences may be stored per row of microcode ROM, as shown at 501. A group of microcode operations included in a microcode routine along with a corresponding control sequence may be accessed at 503. Based on information included in the control sequence and, in some cases, branch prediction data, the row within the microcode ROM and the position within the row for the next group of microcode operations included in the microcode routine may be determined at 505. For example, the control sequence may include the address of the row in which the next groups of microcode operations are stored. Alternatively, the control sequence may include information that can be used by a branch prediction mechanism to produce the address of the row in which the next groups of microcode operations are stored. The control sequence may include sub-address information that determines the position within the row at which the next groups of microcode operations are stored. In some embodiments, groups of microcode operations of different sizes may be stored in different segments of the microcode ROM such that the address of the row in which a group is stored determines the number of groups of operations stored in that row and also the positions of the associated control sequences.

Figure 5B:
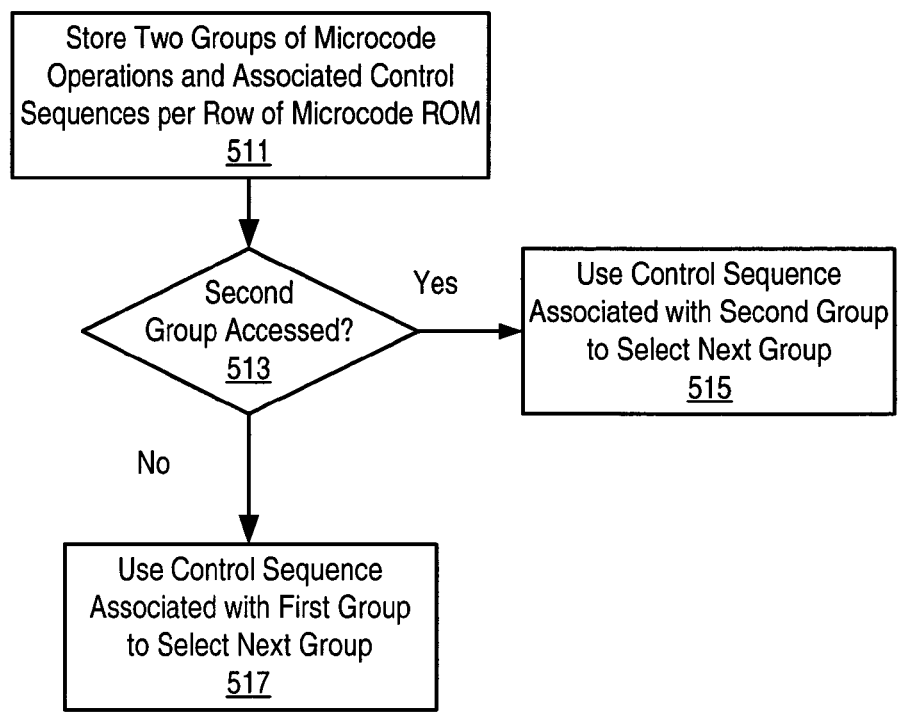
FIG. 5B is a flowchart of a method of operating an integrated circuit containing a microcode ROM storing two groups of microcode operations and their associated control sequences per row, according to one embodiment.

FIG. 5B is a flowchart showing a method of operating an integrated circuit containing a microcode ROM, according to one embodiment. In this embodiment, two groups of microcode operations and associated control sequences may be stored per row of the microcode ROM, as shown at 511. If the first group of microcode operations stored in a row is accessed, as illustrated at 513, then the control sequence associated with the first group may be used to select the next group of microcode operations to access, as shown at 517. The control sequence may indicate whether both groups included in the row storing the next group should be accessed in some embodiments.

If instead the second group of microcode operations is accessed at 513, the control sequence associated with the second group of microcode operations may be used to identify the next group of microcode operations to access, as illustrated at 515. For example, the first group of microcode operations stored in a row of microcode ROM may be the last group of a microcode routine. The second group stored in the row may be the first group of microcode instructions included in another microcode routine. The second group may be accessed as a result of entry point generation and the control sequence associated with the second group of microcode instructions may be used to select the next group to access.

Exemplary Computer Systems

Figure 6:
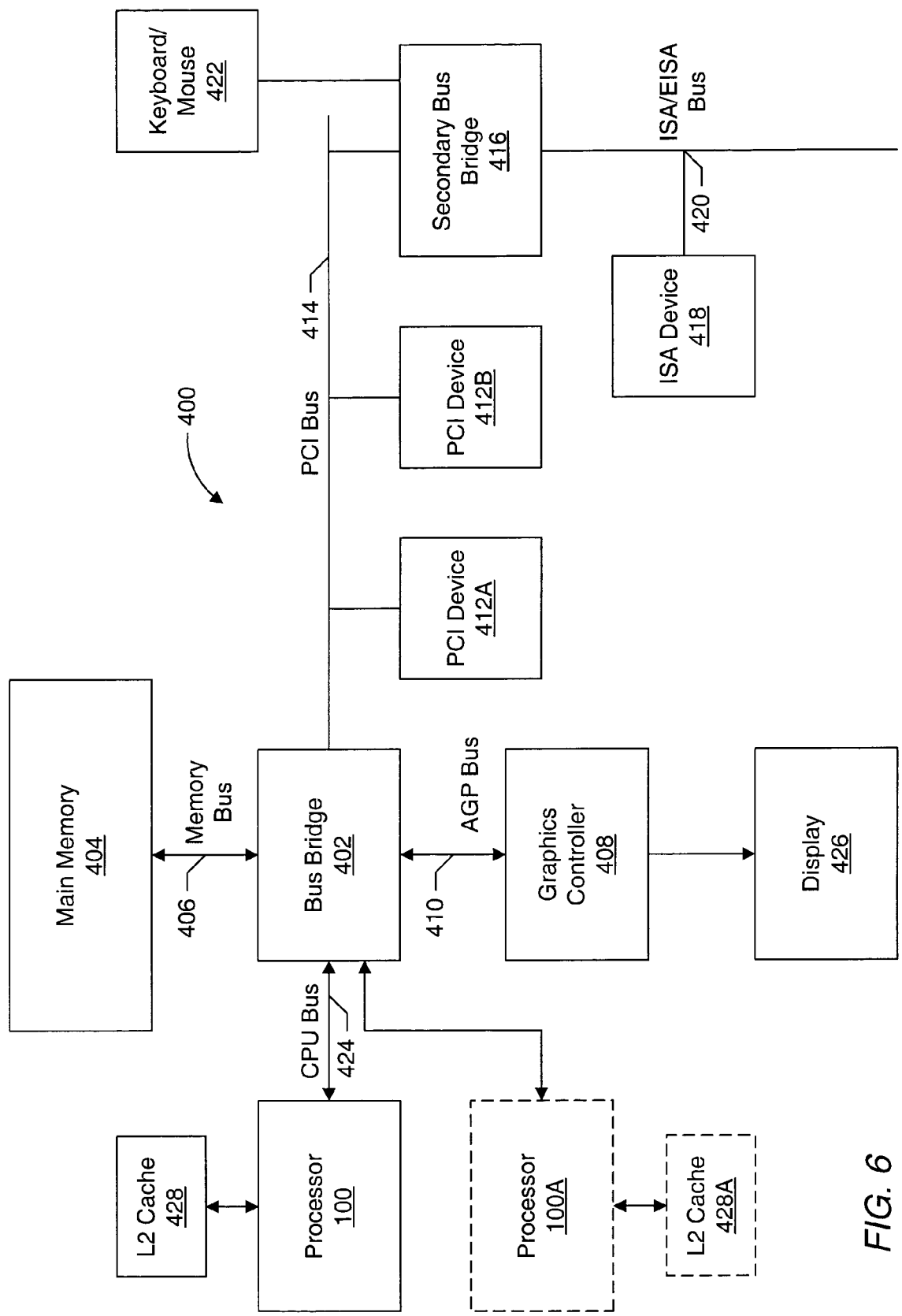
FIG. 6 is a block diagram of an exemplary computer system incorporating a microcode ROM storing multiple groups of microcode operations and their associated control sequences per row, according to one embodiment.

FIG. 6 shows a block diagram of one embodiment of a computer system 400 that includes a processor 100 coupled to a variety of system components through a bus bridge 402. Processor 100 may include a microcode ROM storing multiple groups of microcode operations and associated control sequences per row. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Several PCI devices 412A-412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 100 is coupled to bus bridge 402 through a CPU bus 424 and to an optional L2 cache 428. In some embodiments, the processor 100 may include an integrated L1 cache (not shown).

Bus bridge 402 provides an interface between processor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 100 and bus bridge 402 in other embodiments. Alternatively, the external cache may be coupled to bus bridge 402 and cache control logic for the external cache may be integrated into bus bridge 402. L2 cache 428 is shown in a backside configuration to processor 100. It is noted that L2 cache 428 may be separate from processor 100, integrated into a cartridge (e.g., slot 1 or slot A) with processor 100, or even integrated onto a semiconductor substrate with processor 100.

Main memory 404 is a memory in which application programs are stored and from which processor 100 primarily executes. A suitable main memory 404 includes DRAM (Dynamic Random Access Memory). For example, a plurality of banks of SDRAM (Synchronous DRAM) or Rambus DRAM (RDRAM) may be suitable.

PCI devices 412A-412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 100A shown as an optional component of computer system 400). Processor 100A may be similar to processor 100. More particularly, processor 100A may be an identical copy of processor 100. Processor 100A may be connected to bus bridge 402 via an independent bus or may share CPU bus 224 with processor 100. Furthermore, processor 100A may be coupled to an optional L2 cache 428A similar to L2 cache 428.

Figure 7:
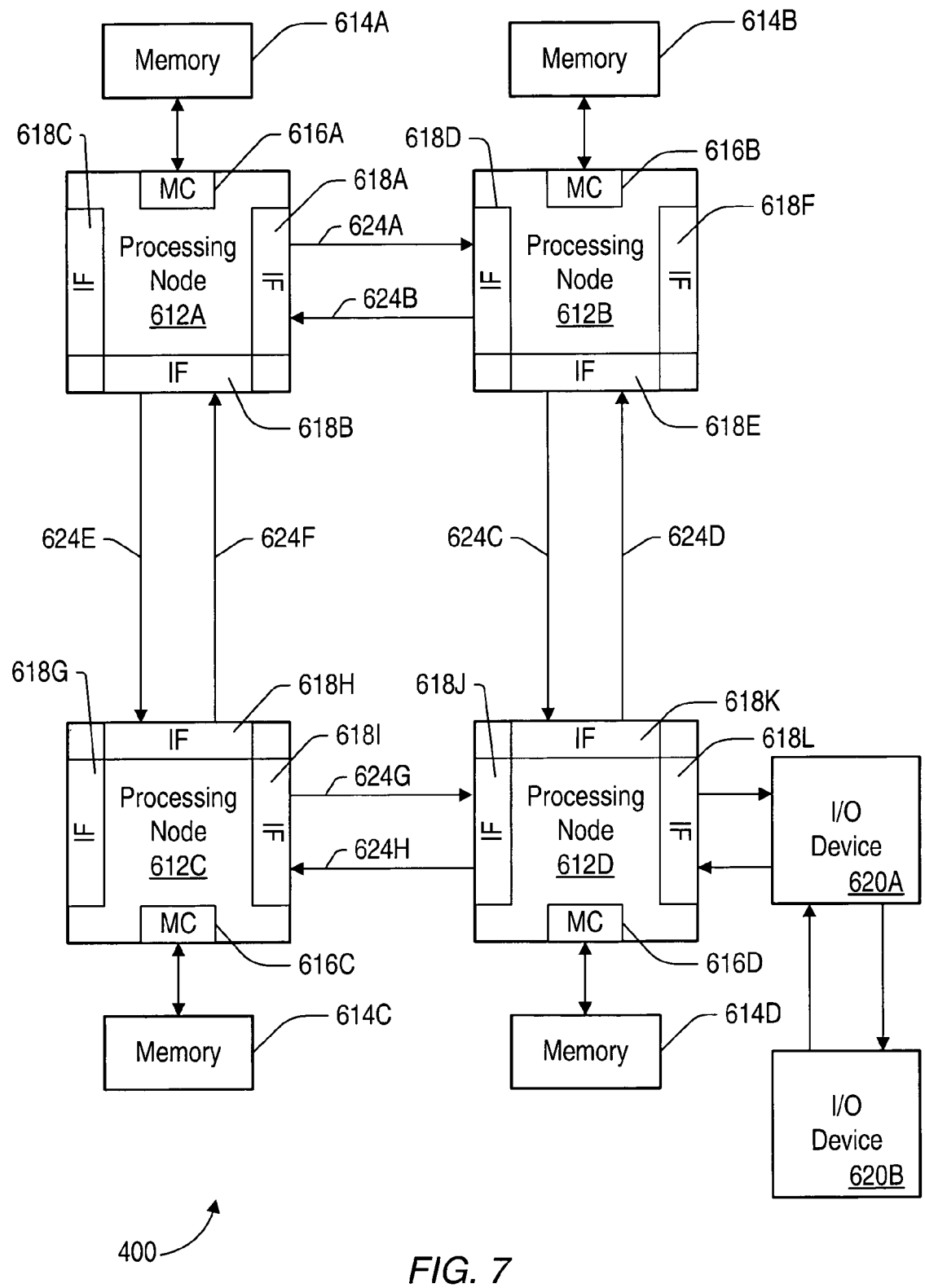
FIG. 7 is a block diagram of an exemplary multi-processor computer system incorporating microcode ROMs storing multiple groups of microcode operations and their associated control sequences per row, according to one embodiment.

Turning now to FIG. 7, another embodiment of a computer system 400 that may include processors that include microcode ROMs storing multiple groups of microcode operations and associated control sequences per row, as described above, is shown. Other embodiments are possible and contemplated. In the embodiment of FIG. 7, computer system 400 includes several processing nodes 612A, 612B, 612C, and 612D. Each processing node is coupled to a respective memory 614A-614D via a memory controller 616A-616D included within each respective processing node 612A-612D. Additionally, processing nodes 612A-612D include interface logic used to communicate between the processing nodes 612A-612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A-620B in a daisy chain configuration) via interface logic 618L. Other processing nodes may communicate with other I/O devices in a similar fashion.

Processing nodes 612A-612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C-624H are used to transmit packets between other processing nodes as illustrated in FIG. 6. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 7. Any suitable routing algorithm may be used. Other embodiments of computer system 400 may include more or fewer processing nodes then the embodiment shown in FIG. 7.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A-612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A-612D may include one or more copies of microprocessor 100.

Memories 614A-614D may include any suitable memory devices. For example, a memory 614A-614D may include one or more RAMBUS DRAMs (RDRAMs), synchronous DRAMs (SDRAMs), static RAM, etc. The address space of computer system 400 is divided among memories 614A-614D. Each processing node 612A-612D may include a memory map used to determine which addresses are mapped to which memories 614A-614D, and hence to which processing node 612A-612D a memory request for a particular address should be routed. In one embodiment, the coherency point for an address within computer system 400 is the memory controller 616A-616D coupled to the memory storing bytes corresponding to the address. In other words, the memory controller 616A-616D is responsible for ensuring that each memory access to the corresponding memory 614A-614D occurs in a cache coherent fashion. Memory controllers 616A-616D may include control circuitry for interfacing to memories 614A-614D. Additionally, memory controllers 616A-616D may include request queues for queuing memory requests.

Interface logic 618A-618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A-620B may be any suitable I/O devices. For example, I/O devices 620A-620B may include devices for communicate with another computer system to which the devices may be coupled (e.g., network interface cards or modems). Furthermore, I/O devices 620A-620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
   a microcode ROM, wherein a row in the microcode ROM stores a plurality of groups of microcode operations, wherein a group of the plurality of groups of microcode operations is comprised in a microcode routine, and wherein the row stores an associated control sequence for each of the plurality of groups of microcode operations; and
   a control sequence logic unit coupled to the microcode ROM, wherein in response to accessing the group of microcode operations comprised in the microcode routine, the control sequence logic unit is configured to use the control sequence associated with the group of microcode operations to identify an other row storing one or more next groups of microcode operations comprised in the microcode routine.

2. The microprocessor of claim 1, wherein at least one of the plurality of groups of microcode operations stored in the row is part of a different microcode routine.

3. The microprocessor of claim 1, wherein the control sequence logic unit is configured to identify which of a plurality of groups of microcode operations stored in the other row of the microcode ROM are comprised in the microcode routine based on information contained in the control sequence associated with the group of microcode operations stored in the row.

4. The microprocessor of claim 3, wherein if fewer than all of a plurality of groups of microcode operations stored in the other row of the microcode ROM are comprised in the microcode routine, the control sequence logic unit is configured to substitute NOPs for the microcode operations comprised in the groups not comprised in the microcode routine when outputting the row to the scheduler.

5. The microprocessor of claim 1, wherein if the group of microcode operations comprises at least one branch operation, the control sequence logic unit is configured to identify the next group of microcode operations in the microcode routine dependent on a branch prediction as well as the control sequence associated with the group of microcode operations.

6. The microprocessor of claim 1, wherein the microcode ROM is divided into a plurality of segments, wherein a same number of groups of microcode operations is stored in each row of a given one of the plurality of segments, and wherein each row in the given one of the plurality of segments stores a different number of groups of microcode operations than each row in each other one of the plurality of segments.

7. The microprocessor of claim 6, wherein groups of microcode operations stored in a same one of the plurality of segments have a same maximum width.

8. The microprocessor of claim 7, wherein groups of microcode operations stored in one of the plurality of segments have a maximum width that is different from a maximum width of groups of microcode operations stored in another one of the plurality of segments.

9. The microprocessor of claim 8, wherein one of the plurality of segments stores one group of microcode operations and one associated control sequence per row.

10. The microprocessor of claim 6, wherein the control sequence logic unit is configured to identify a position of one or more groups of microcode operations and a position of one or more control sequences dependent on which of the plurality of segments of the microcode ROM stores the one or more groups of microcode operations.

11. The microprocessor of claim 1, wherein a plurality of groups of microcode operations stored in the other row of the microcode ROM are comprised in the microcode routine and are output during a single access.

12. A computer system, comprising:
a system memory; and
a microprocessor coupled to the system memory, comprising:
a microcode ROM, wherein a row in the microcode ROM stores a plurality of groups of microcode operations, wherein one of the plurality of groups of microcode operations is comprised in a particular microcode routine, and wherein the row stores an associated control sequence for each of the plurality of groups of microcode operations; and
a control sequence logic unit coupled to the microcode ROM, wherein in response to accessing the group of microcode operations comprised in the microcode routine, the control sequence logic unit is configured to use the control sequence associated with the group of microcode operations to identify an other row storing one or more next groups of microcode operations comprised in the microcode routine.

13. The computer system of claim 12, wherein at least one of the plurality of groups of microcode operations stored in the row is part of a different microcode routine.

14. The computer system of claim 12, wherein the control sequence logic unit is configured to identify which of a plurality of groups of microcode operations stored in the other row of the microcode ROM are comprised in the microcode routine, based on information contained in the control sequence associated with the group of microcode operations stored in the row.

15. The computer system of claim 14, wherein if fewer than all of a plurality of groups of microcode operations stored in the other row of the microcode ROM are comprised in the microcode routine, the control sequence logic unit is configured to substitute NOPs for the microcode operations comprised in the groups not comprised in the microcode routine when outputting the row to the scheduler.

16. The computer system of claim 12, wherein if the group of microcode operations comprises at least one branch operation, the control sequence logic unit is configured to identify the next group of microcode operations in the microcode routine dependent on branch prediction as well as the control sequence associated with the group of microcode operations.

17. The computer system of claim 12, wherein the microcode ROM is divided into a plurality of segments, wherein a same number of groups of microcode operations is stored in each row of any of the plurality of microcode ROM segments, and wherein the number of groups of microcode operations stored in a row in one of the plurality of microcode ROM segments differs from the number of groups of microcode operations stored in a row in another one of the plurality of microcode ROM segments.

18. The computer system of claim 17, wherein groups of microcode operations stored in any one of the plurality of microcode ROM segments have a same maximum width.

19. The computer system of claim 18, wherein groups of microcode operations stored in one of the plurality of microcode ROM segments have a maximum width that is different from a maximum width of groups of microcode operations stored in another one of the plurality of microcode ROM segments.

20. The computer system of claim 19, wherein one of the plurality of microcode ROM segments stores one group of microcode operations and one associated control sequence per row.

21. The computer system of claim 17, wherein the control sequence logic unit is configured to identify a position of one or more groups of microcode operations within a row and their associated control sequences dependent on which of the plurality of segments of the microcode ROM stores the one or more groups of microcode operations.

22. The computer system of claim 12, wherein a plurality of groups of microcode operations stored in the other row of the microcode ROM and comprised in the microcode routine are output during a single access.

23. A method, comprising:
storing a plurality of groups of microcode operations and a plurality of control sequences in a row in a microcode ROM, wherein each of the plurality of control sequences is associated with a respective one of the groups of microcode operations; and
in response to accessing one of the plurality of groups of microcode operations, using the one of the plurality of control sequences associated with that one of the plurality of groups to identify a next group of microcode operations to output from the microcode ROM.

24. The method of claim 23, further comprising identifying the next group of microcode operations based on one or more branch predictions as well as the one of the plurality of control sequences if the one of the plurality of groups of microcode operations includes one or more branch operation.

25. The method of claim 23, further comprising substituting NOPs for one or more groups of microcode instructions stored in a same row as the next group of microcode operations dependent on the one of the plurality of control sequences.

26. The method of claim 25, wherein the groups of microcode operations comprised in the microcode routine and the NOPs are output as a single line.

27. A system, comprising:
  a microcode ROM, wherein a row in the microcode ROM stores a plurality of groups of microcode operations and wherein the row stores an associated control sequence for each of the plurality of groups; and
  means for accessing a control sequence associated with one of the plurality of groups of microcode operations and responsively accessing a next group of microcode operations stored in the microcode ROM.

* * * * *